United States Patent [19]

Donovan et al.

[11] 3,937,517

[45] Feb. 10, 1976

[54] PROTECTIVE CANOPY

[75] Inventors: William J. Donovan; G. Robert Frey, both of Franklin, Pa.

[73] Assignee: Joy Manufacturing Company, Pittsburgh, Pa.

[22] Filed: May 13, 1974

[21] Appl. No.: 469,185

[52] U.S. Cl. ............... 296/68; 175/219; 296/65 A; 296/137 C; 296/146; 297/184; 297/329; 299/12
[51] Int. Cl.² .......................................... B60N 1/04
[58] Field of Search ............ 296/65 R, 65 A, 68, 67, 296/146, 137 R, 137 C, 137 D, 35 B; 180/82 R; 299/12; 175/219; 297/184, 329; 27/12

[56] References Cited
UNITED STATES PATENTS

| | | | |
|---|---|---|---|
| 676,741 | 6/1901 | Flannery | 297/184 |
| 3,488,086 | 1/1970 | Himka et al. | 296/65 R |

FOREIGN PATENTS OR APPLICATIONS

| | | | |
|---|---|---|---|
| 946,601 | 8/1956 | Germany | 296/65 R |

*Primary Examiner*—Frank E. Werner
*Assistant Examiner*—Gary Auton

[57] ABSTRACT

An underground mining apparatus and more particularly an underground mining apparatus having improved protective canopy means extending partially thereover.

8 Claims, 3 Drawing Figures

PROTECTIVE CANOPY

Underground mobile mining apparatus known in the art has commonly included thereon a control station which in practice is occupied by an operator who actuates control means located therewithin as required to control the apparatus during mining operations. Such control stations have often included rigid protective canopy means which extend thereover to shield the operator from hazards such as a mine roof collapse or the like.

Although protective canopies known in the prior art have generally served the purposes for which they were designed they have nonetheless been subject to certain undesirable shortcomings. For example some mining machines have included canopy structures which extended to a substantially greater vertical height than the rest of the mining machine thus limiting machine utility, particularly in the case of very low slung and compact machines which are intended to provide access to restricted mine areas for such purposes as mining very thin seams of mineral. The inclusion of a fixed canopy structure extending above such machines substantially negates the advantages of a low slung and compact machine design. Additionally, in the prior art the machine operator has customarily been positioned within the control station with his head and shoulders extending above the top of the machine base to afford him an unobstructed view of the ongoing machine operation under his control. Prior adjustable and fixed protective canopy structures therefore have not adequately protected the machine operator inasmuch as collapse of the canopy under excessive loading could seriously injure the operator.

The present invention provides an improved protective canopy and operator seat arrangement for an underground mining apparatus which remedies the difficulties mentioned hereinabove and which additionally provides a variety of operating positions for the machine operator.

These and other objects and advantages of the present invention are more fully specified in the following description and illustrations in which.

Figure 1:
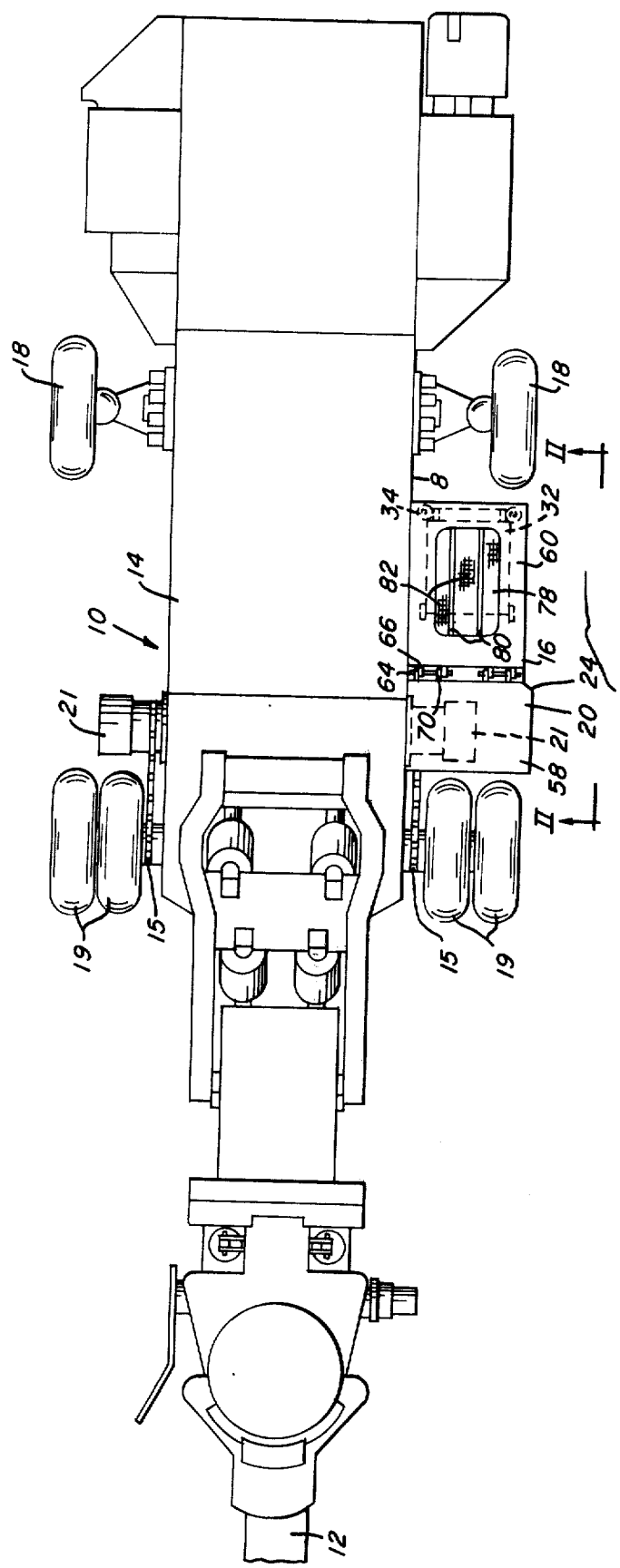
FIG. 1 illustrates in top plan view a mining apparatus including a protective canopy constructed in accordance with the principles of the present invention.

There is generally indicated at 10 in FIG. 1 an underground mining apparatus having a cab structure 16 including a protective canopy 60 constructed in accordance with the principles of the present invention. Apparatus 10 is shown for purposes of illustration as being a conventional kerf cutting machine although it will be apparent that canopy 60 is adaptable for use with various other types of underground mining equipment such as drills or continuous miners as well as with surface mining equipment and other mobile machines.

Inasmuch as the cutter 10 is well known in the art and in any case a detailed description thereof is not necessary for an understanding of the present invention, detailed description thereof is not provided herein. Suffice it to note in this regard that cutter 10 includes a conventional elongated cutter bar 12, and a generally rectangular mobile base 14 which adjustably carries the cutter 12 adjacent the forward end thereof in the customary manner. The base 14 includes: rubber tired traction wheels 19 which are connected as by drive chains 15 to suitable traction motors 21 carried rearwardly adjacent the wheels 19; and rubber tired steering wheels 18 spaced rearwardly from the wheels 19 whereby cutter 10 is rendered movable over a surface and more particularly is rendered maneuverable in an underground mine to be selectively positionable adjacent a mine face to cut horizontal kerfs therein at any desired location intermediate the mine floor and ceiling, and additionally to cut vertical shear-kerfs at any desired location intermediate adjacent mine ribs or side walls.

Figure 2:
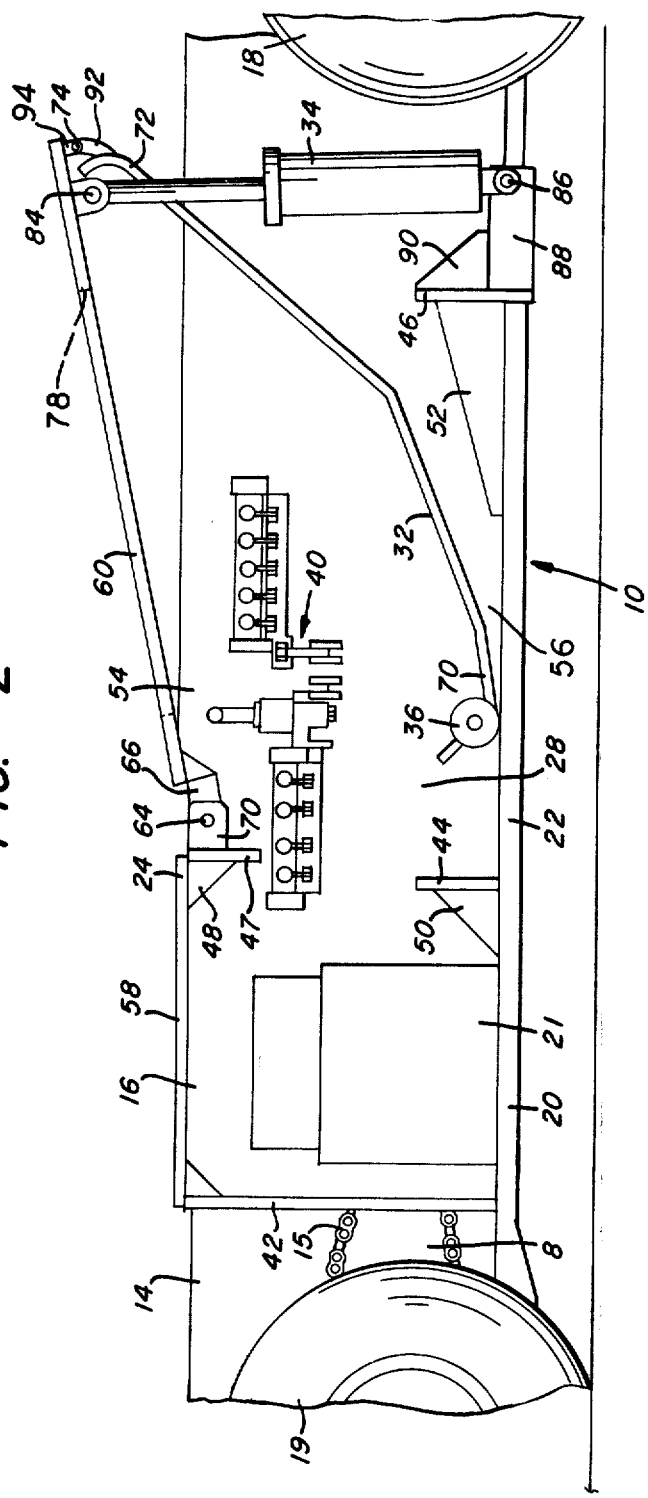
FIG. 2 illustrates the protective canopy of the present invention substantially as seen from line 2—2 of FIG. 1.

As will be seen by reference to FIGS. 1 and 2, cab 16 comprises a generally rectangular box-like body 20 suitably and rigidly affixed adjacent one vertical side wall 8 of base 14 such as by weldments (not shown) so as to extend laterally outwardly therefrom intermediate the wheels 18 and 19. As shown, body 20 includes: a flat horizontally disposed lower or floor portion 22; an upper or roof portion 24 spaced upwardly from floor 22; a forward end wall 42 which extends vertically intermediate portions 22 and 24 adjacent the respective forward ends thereof; an upper transverse support member 47 affixed adjacent roof portion 24 intermediate the longitudinal ends thereof and adapted to provide rigid support therefor; and forward and rearward lower transverse support members 44 and 46, respectively, affixed adjacent longitudinally spaced portions of floor 22 and adapted to provide rigid support therefor. The support afforded by members 47, 44 and 46 may be augmented by respective gusset plates 48, 50 and 52 rigidly affixed thereto as shown or by any other suitable structural refinement.

The cab 16 further comprises: an inner wall portion 54 which extends vertically intermediate the laterally innermost sides of portions 22 and 24 adjacent the base 14 and is formed by a portion of the vertical side wall 8 of base 14 to which the cab 16 is affixed; an outer side opening 56 located adjacent the laterally outermost side of cab 16 and extending sufficiently in all directions within the vertical plane of such outermost side as to permit substantially unobstructed entry to and egress from cab 16 by an operator or passenger; and a space 28 housed by the cab 16 vertically intermediate portions 22 and 24 and laterally intermediate wall portion 54 and opening 56. The space 28 includes a contoured seat 32 carried therewithin in a manner to be described hereinbelow, and may include suitable controls 40 which as shown are carried adjacent wall portion 54 so as to be accessible by an operator sitting in seat 32 to control operation of the cutter 10.

The roof portion 24 includes: a rigid forward portion 58 which extends longitudinally intermediate wall 42 and support 47 and is rigidly affixed thereto; and the rigid canopy portion 60 located rearwardly adjacent portion 58 and pivotally secured adjacent support member 47 as by a pivot pin 64 passing laterally through overlapping tongue or lug portions 66 and 70, respectively, of canopy 60 and member 47 whereby the canopy 60 is rendered pivotal intermediate a lower horizontal position corresponding to the plane of roof portion 58 and an upper position pivoted generally upwardly from such lower position. The canopy 60 is formed from substantial and rigid material such as thick steel plate and has bars 80 (FIG. 1) or heavy screening 82 covering a viewing port 78 to protect the operator in the event of a mine roof collapse or like event.

Suitable and well known extensible hydraulic cylinder assemblies 34 (FIG. 2) extend generally vertically intermediate a rearward end portion of canopy 60 and a support member 88 rigidly affixed rearwardly adjacent member 46 as by weldments (not shown) and supported as by a gusset 90. Assemblies 34 preferably are spaced laterally apart and are pivotally affixed adjacent respective longitudinal ends thereof to the canopy 60 and the member 88 in the position described as by respective laterally disposed upper and lower pivot pins 84 and 86. In practice fluid power is supplied to the assemblies 34 from any suitable source (not shown) to render canopy 60 movable intermediate its extreme uppermost and lowermost positions by controlled extension and retraction of the assemblies 34 and to further render the canopy 60 positionable at any position intermediate its extreme positions.

Figure 3:
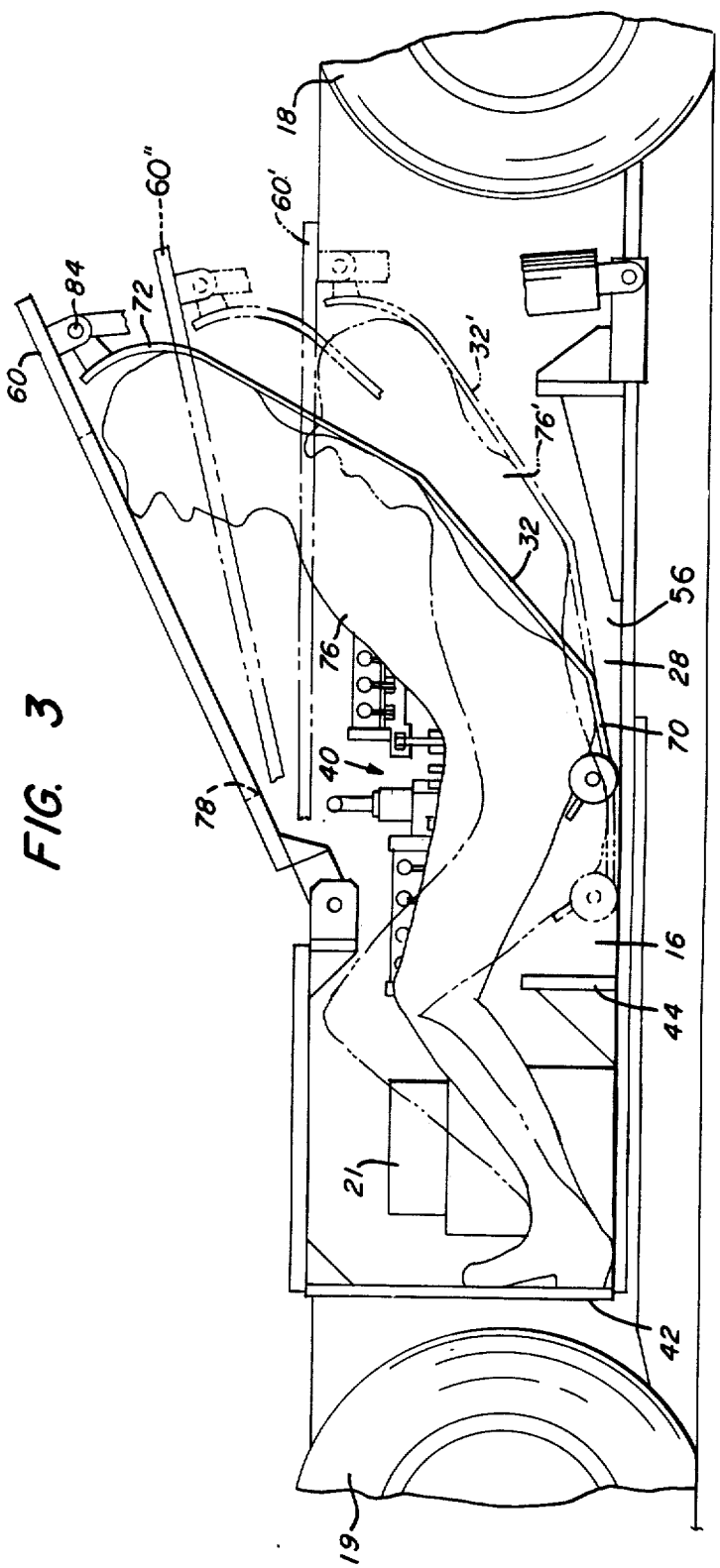
FIG. 3 illustrates selected operating positions of the protective canopy.

The contoured seat 32 includes: a lower forward portion 70 having laterally spaced rollers 36 which are adapted to support seat 32 thereat by means of rolling engagement upon floor 22 intermediate supports 44 and 46; and an upper rearward head support and shield portion 72 pivotally secured to a rearward end portion of canopy 60 as by pivot pins 74 coupling generally rearwardly extending laterally spaced lug portions 92 of seat portion 72 to mating lugs 94 of canopy 60 (FIG. 2). Alternatively, the seat portion 72 may be pivotally coupled to canopy 60 by means of the pin 84 (FIG. 3). It will be apparent from the description hereinabove and by reference to FIG. 3 that as canopy 60 is moved intermediate its uppermost and lowermost positions by actuation of assemblies 34 the seat 32 moves intermediate a relatively upright position and a fully reclining position in the following manner.

An operator 76 enters the cab 16 via opening 56 and seats himself in seat 32 facing forwardly such that his buttocks rest on seat portion 70, his head is supported and shielded from behind by seat portion 72 and his back is supported by the portion of seat 32 extending intermediate portions 70 and 72. The operator's legs extend forwardly of seat 32, his knees bending upwardly over support 44 and his feet resting against forward wall 42 outwardly adjacent the motor 21. During normal operation the position of the operator 76 is as shown by solid lines in FIG. 3. Seat 32 is in a relatively upright position and canopy 60 is fully raised, also as indicated by solid lines in FIG. 3, such that the operator 76 has a clear view of the machine operation through viewing port 78 and the controls 40 are readily at hand.

As noted hereinabove, the canopy 60 is designed to protect the operator 76 from harm in the event of a mine roof collapse or like event and will ordinarily do so without moving to a lower position inasmuch as the assemblies 34 act to cushion the impact loading of such a roof collapse. However, in the event the canopy 60 is forced downwardly by excessive loading thereupon, for example to the position indicated at 60', the canopy movement will lower the seat 32 to a reclining position within space 28 as indicated at 32' by lowering the seat head support portion 72 and thereby causing the seat forward end portion 70 to roll forwardly on floor 22 by means of rollers 36. Consequently, in response to lowering of the canopy 60 the operator 76 will escape harm by automatically assuming a reclining position within space 28 as indicated at 76'. At the canopy position 60' the assemblies 34 are fully retracted and therefore act as solid links to provide additional support for canopy 60.

Of course, it may be desirable under some circumstances to position the canopy 60 at a selected intermediate position by means of a suitable control included among controls 40, for example to negotiate a restricted passage in the mine. In this case the operator 76 would assume a partially reclining position in response to movement of the canopy 60, for example the position indicated at 60", whereat his view through port 78 would be partially but not completely obstructed and he would thus be able to continue limited machine operation. At numerous intermediate positions (not shown) between the canopy positions 60 and 60" to which the canopy 60 may be moved by actuation of assemblies 34 the operator 76 retains a substantially unobstructed view through port 78 and is capable of maintaining substantially full and normal machine operation. Any of such positions may be selected by the operator at will for maximum comfort and ease of operation.

By virtue of the structure described hereinabove an improved and safer adjustable protective canopy is provided which automatically adjusts the posture of the machine operator in response to movement of the canopy thereby affording the operator maximum visibility and comfort during normal operation and maximum safety in the event of a mine roof collapse or similar dangerous circumstance. Additionally, the present invention provides a variety of operating positions with the canopy partially lowered including positions which allow the machine to be negotiated through or operated in restricted mine areas not accessible by machines with fixed canopy structures.

Notwithstanding reference hereinabove to a specific embodiment, it is to be understood that the present invention may be modified in various ways without departing from the broad spirit and scope thereof. For example: seat 32 may be of various forms and may be suspended from canopy 60 in numerous ways such as by elongated pivotal links extending intermediate canopy 60 and seat 32 and secured thereto by pivot pins disposed adjacent the opposing ends of such links; cylinders 34 may be compound cylinders having a plurality of coaxially aligned extensible portions or may include a relief valve in the extension side thereof to lower the canopy 60 automatically under excessive loading; and the like.

These and other modifications having been envisioned and anticipated it is requested that the invention be interpreted broadly and limited only by the scope of the claims appended hereto.

What is claimed is:

1. A mobile machine comprising: a chasis; a canopied occupant positioning assembly carried by said chassis; said positioning assembly including an occupant support portion and an overlying rigid canopy portion and being adapted to receive an occupant therewithin and to orient such occupant to face in a forward direction; said canopy portion being pivotally connected adjacent one peripheral portion thereof to said chassis and connected adjacent an opposite peripheral portion thereof with said support portion; said one peripheral portion being spaced from said opposite peripheral portion in said forward direction; and adjusting means communicating between said assembly and said chassis for selectively adjusting the overall height of said occupant positioning assembly.

2. A mobile machine as specified in claim 1 wherein one end of said support portion is supported by said chassis and is adapted to slide therealong in response to the selective height adjustment of said adjusting means.

3. A mobile machine as specified in claim 2 wherein said adjusting means is pivotally connected to said chassis adjacent one end thereof and to said positioning assembly adjacent the other end thereof with said last mentioned pivotal connection being adjacent the other end of said support portion.

4. A mobile machine as specified in claim 1 wherein said positioning assembly is selectively adjustable between a first position wherein said canopy portion extends diagonally upwardly from said chassis and a second position wherein said canopy portion extends generally parallel to said chassis.

5. A mobile machine as specified in claim 4 wherein said opposite peripheral portion of said canopy lies no higher than the upper extremity of said chassis when said positioning assembly is in said second position.

6. A mobile machine as specified in claim 1 wherein said canopy portion includes at least one occupant viewing opening therein.

7. A mobile machine as specified in claim 1 wherein said chassis includes a portion adapted to support and protect an occupant's lower limbs.

8. A mobile machine as specified in claim 1 wherein said support portion is adapted to support an occupant's trunk, neck and head.

* * * * *